US009475388B2

(12) United States Patent
Jess et al.

(10) Patent No.: US 9,475,388 B2
(45) Date of Patent: Oct. 25, 2016

(54) DRAG TORQUE REQUEST SECURITY DIAGNOSTIC SYSTEMS AND METHODS

(75) Inventors: Richard B. Jess, Haslett, MI (US); Michael L. Kociba, Hartland, MI (US); Joseph M. Stempnik, Warren, MI (US); James L. Worthing, Munith, MI (US); Katie C. Bonasse, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2129 days.

(21) Appl. No.: 12/424,230

(22) Filed: Apr. 15, 2009

(65) Prior Publication Data

US 2009/0287378 A1    Nov. 19, 2009

Related U.S. Application Data

(60) Provisional application No. 61/127,490, filed on May 14, 2008.

(51) Int. Cl.
*B60K 28/16* (2006.01)
*B60T 8/175* (2006.01)

(52) U.S. Cl.
CPC .............. *B60K 28/16* (2013.01); *B60T 8/175* (2013.01); *B60W 2710/0666* (2013.01); *F02D 2250/00* (2013.01)

(58) Field of Classification Search
CPC ............... B60K 28/16; B60T 8/175; B60W 2710/0666; F02D 2250/00
USPC ................................. 701/84, 54, 62; 180/197
See application file for complete search history.

(56) References Cited

U.S. PATENT DOCUMENTS

| 3,802,528 | A  | * | 4/1974  | Leiber ........................... 180/271 |
| 5,024,285 | A  | * | 6/1991  | Fujita ............................ 180/197 |
| 5,077,672 | A  | * | 12/1991 | Nobumoto et al. ............ 701/92 |
| 5,291,408 | A  | * | 3/1994  | Thatcher ......................... 701/90 |
| 5,415,600 | A  | * | 5/1995  | Mochizuki et al. .......... 477/110 |
| 5,692,472 | A  | * | 12/1997 | Bederna et al. .............. 123/350 |
| 6,061,622 | A  | * | 5/2000  | Probst ............................. 701/84 |
| 6,240,355 | B1 | * | 5/2001  | Schmitt .......................... 701/84 |
| 6,285,946 | B1 | * | 9/2001  | Steinmann .................... 701/110 |
| 6,360,837 | B1 | * | 3/2002  | Maier-Landgrebe ......... 180/197 |

(Continued)

FOREIGN PATENT DOCUMENTS

| DE | 19913824 A1 | 9/2000 |
| DE | 10060347 A1 | 8/2001 |

(Continued)

OTHER PUBLICATIONS

German Office Action dated Jun. 14, 2011 from the German Patent Office for Serial No. 10 2009 020219.6; 5 pages.
U.S. Appl. No. 12/357,740, filed Jan. 22, 2009, Jess.
U.S. Appl. No. 12/364,027, filed Feb. 2, 2009, Jess.

*Primary Examiner* — Joseph Rocca
*Assistant Examiner* — Maurice Williams (57) ABSTRACT

An engine control system for a vehicle comprises a torque module and a drag request evaluation module. The torque module controls torque output of an engine based on a driver torque request and increases the torque output based on a wheel drag torque request generated based on a driven wheel speed. The drag request evaluation module disables the increase of the torque output when the driven wheel speed is greater than an undriven wheel speed by more than a predetermined speed.

19 Claims, 6 Drawing Sheets

(56) References Cited

U.S. PATENT DOCUMENTS

| | | |
|---|---|---|
| 6,535,809 B1* | 3/2003 | Beyer et al. ............... 701/84 |
| 6,952,638 B2* | 10/2005 | Sauter ........................ 701/84 |
| 2005/0192154 A1* | 9/2005 | Sakamoto et al. ......... 477/109 |
| 2005/0239599 A1* | 10/2005 | Bauerle et al. ............ 477/156 |
| 2005/0288842 A1* | 12/2005 | Brewer et al. .............. 701/70 |

FOREIGN PATENT DOCUMENTS

| | | |
|---|---|---|
| DE | 10055868 A1 | 10/2001 |
| DE | 102005002265 A1 | 8/2006 |
| WO | WO 0140041 A1 | 6/2001 |

* cited by examiner

DRAG TORQUE REQUEST SECURITY DIAGNOSTIC SYSTEMS AND METHODS

CROSS-REFERENCE TO RELATED APPLICATIONS

This application claims the benefit of U.S. Provisional Application No. 61/127,490, filed on May 14, 2008. The disclosure of the above application is incorporated herein by reference.

FIELD

The present disclosure relates to vehicle systems and more particularly to internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate at which fuel is injected to provide a desired air/fuel mixture to the cylinders. Increasing the air and fuel to the cylinders increases the torque output of the engine.

Engine control systems have been developed to control torque output by the engine to achieve a desired torque. Other vehicle systems, such as a chassis control system, may request that the torque output of the engine be increased above the driver requested torque for various reasons. For example, the excess torque may be used to eliminate dragging of a wheel of the vehicle, increase vehicle traction, increase vehicle stability, smooth a gear shift, and/or for other suitable purposes.

A wheel drag event occurs when a driven wheel of the vehicle decelerates at a different rate than undriven wheels of the vehicle. A drag event of a driven wheel may be caused by, for example, operation of the vehicle on a surface having a low coefficient of friction, a gear shift within a transmission, and/or deactivation of one more cylinders of the engine.

For example, the driver may remove pressure from the accelerator pedal (i.e., reduce the amount of torque requested from the engine) while the vehicle is on a surface having a low coefficient of friction. When the driver removes pressure from the accelerator pedal, vehicle losses cause a negative torque to be applied to the driven wheels of the vehicle. These losses may be attributable to mechanical losses (e.g., friction of the drivetrain), air losses (e.g., pumping losses of the engine), and/or other vehicular losses. As the coefficient of friction is low, the application of the negative torque will cause the driven wheels to decelerate at a faster rate than the undriven wheels and may cause the driven wheels to lock up.

Negative torques may also be applied to the driven wheels when various vehicle operations occur, such as when a gear shift from a lower gear ratio to a higher gear ratio is executed or when one or more cylinders of the engine are deactivated. The negative torque applied by shifting to the higher gear ratio may be caused by the mechanical linkage between the driven wheels and engaged gear. The negative torque applied by deactivating one or more cylinders may be caused by pumping losses of the engine and/or gas trapped within the deactivated cylinders.

When a drag event occurs, the chassis control system generates a drag torque request to increase the torque output of the engine above the driver requested torque. This torque is requested to accelerate the driven wheels to the speed of the undriven wheels. Increasing the torque output by the engine and accelerating the driven wheels when a drag event occurs increases vehicle stability and control.

SUMMARY

An engine control system for a vehicle comprises a torque module and a drag request evaluation module. The torque module controls torque output of an engine based on a driver torque request and increases the torque output based on a wheel drag torque request generated based on a driven wheel speed. The drag request evaluation module disables the increase of the torque output when the driven wheel speed is greater than an undriven wheel speed by more than a predetermined speed.

In other features, the drag request evaluation module disables the increase when an accelerator pedal is actuated longer than a predetermined period during the increase.

In still other features, the predetermined speed is determined based on a maximum difference between the driven wheel speed and the undriven wheel speed during vehicle turning.

In further features, the undriven wheel speed corresponds to a greatest speed of one of a plurality of undriven wheels of the vehicle.

A vehicle system comprises the chassis control module and an engine control module. The chassis control module includes the drag request evaluation module and generates the wheel drag torque request. The engine control module controls the torque output of the engine.

Another vehicle system comprises an engine control module and a chassis control module. The engine control module includes the engine control system. The chassis control module generates the wheel drag torque request.

In still further features, the drag request evaluation module prevents the increase when at least one of: the wheel drag torque request is less than the driver torque request; the driver torque request is greater than a predetermined maximum driver torque request; the wheel drag torque request is one of greater than and less than a stored wheel drag torque request; the wheel drag torque request is greater than a predetermined maximum wheel drag torque request; and the undriven wheel speed is one of greater than and less than a predetermined range of speeds.

In other features, the drag request evaluation module selectively prevents the increase when at least one of: a difference between the driven wheel speed and the undriven wheel speed is less than a predetermined speed difference; and a vehicle deceleration is greater than a predetermined deceleration when the wheel drag torque request is generated.

In still other features, drag request evaluation module prevents the increase while the wheel drag torque request is greater than a predetermined minimum wheel drag torque request.

In further features, the engine control system further comprises a chassis control module that generates the wheel drag torque request. The drag request evaluation module at least one of selectively prevents and disables the increase. The drag request evaluation module provides fault data to the chassis control module when the increase is at least one of prevented and disabled.

An engine control method for a vehicle comprises: controlling torque output of an engine based on a driver torque request; increasing the torque output based on a wheel drag torque request generated based on a driven wheel speed; and disabling the increase of the torque output when the driven wheel speed is greater than an undriven wheel speed by more than a predetermined speed.

In other features, the engine control method further comprises disabling the increasing when an accelerator pedal is actuated longer than a predetermined period during the increase.

In still other features, the predetermined speed is determined based on a maximum difference between the driven wheel speed and the undriven wheel speed during vehicle turning.

In further features, the undriven wheel speed corresponds to a greatest speed of one of a plurality of undriven wheels of the vehicle.

In still further features, the engine control method further comprises generating the wheel drag torque request using a chassis control module and controlling the torque output of the engine using an engine control module.

In other features, the engine control method further comprises preventing the increasing when at least one of: the wheel drag torque request is less than the driver torque request; the driver torque request is greater than a predetermined maximum driver torque request; the wheel drag torque request is one of greater than and less than a stored wheel drag torque request; the wheel drag torque request is greater than a predetermined maximum wheel drag torque request; and the undriven wheel speed is one of greater than and less than a predetermined range of speeds.

In still other features, the engine control method further comprises preventing the increasing when at least one of: a difference between the driven wheel speed and the undriven wheel speed is less than a predetermined speed difference; and a vehicle deceleration is greater than a predetermined deceleration when the wheel drag torque request is generated.

In further features, the engine control method further comprises preventing the increasing while the wheel drag torque request is greater than a predetermined minimum wheel drag torque request.

In still further features, the engine control method further comprises generating the wheel drag torque request using a chassis control module, at least one of selectively preventing and disabling the increasing using a second module, and providing fault data to the chassis control module when the increase is at least one of prevented and disabled.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller controls torque output by an engine based on driver torque requests. In some circumstances, other vehicle systems, such as a chassis control system, may request that the engine controller increase the torque output by the engine above the driver torque request. For example, a chassis control system may generate a drag torque request to cure dragging of a driven wheel of the vehicle.

The engine controller according to the principles of the present disclosure executes the drag torque request and increases the torque output by the engine above the driver torque request after the drag torque request is enabled. A drag request evaluation module evaluates the drag torque request for validity and selectively enables execution of the drag torque request when specified enabling conditions are satisfied.

While the torque output of the engine is increased based on the drag torque request, the drag request evaluation module monitors wheel speed of the driven (dragging) wheel, the wheel for which the drag torque request was generated. The drag request evaluation module selectively disables execution of the drag torque request when the driven wheel speed exceeds the vehicle speed.

Figure 1:
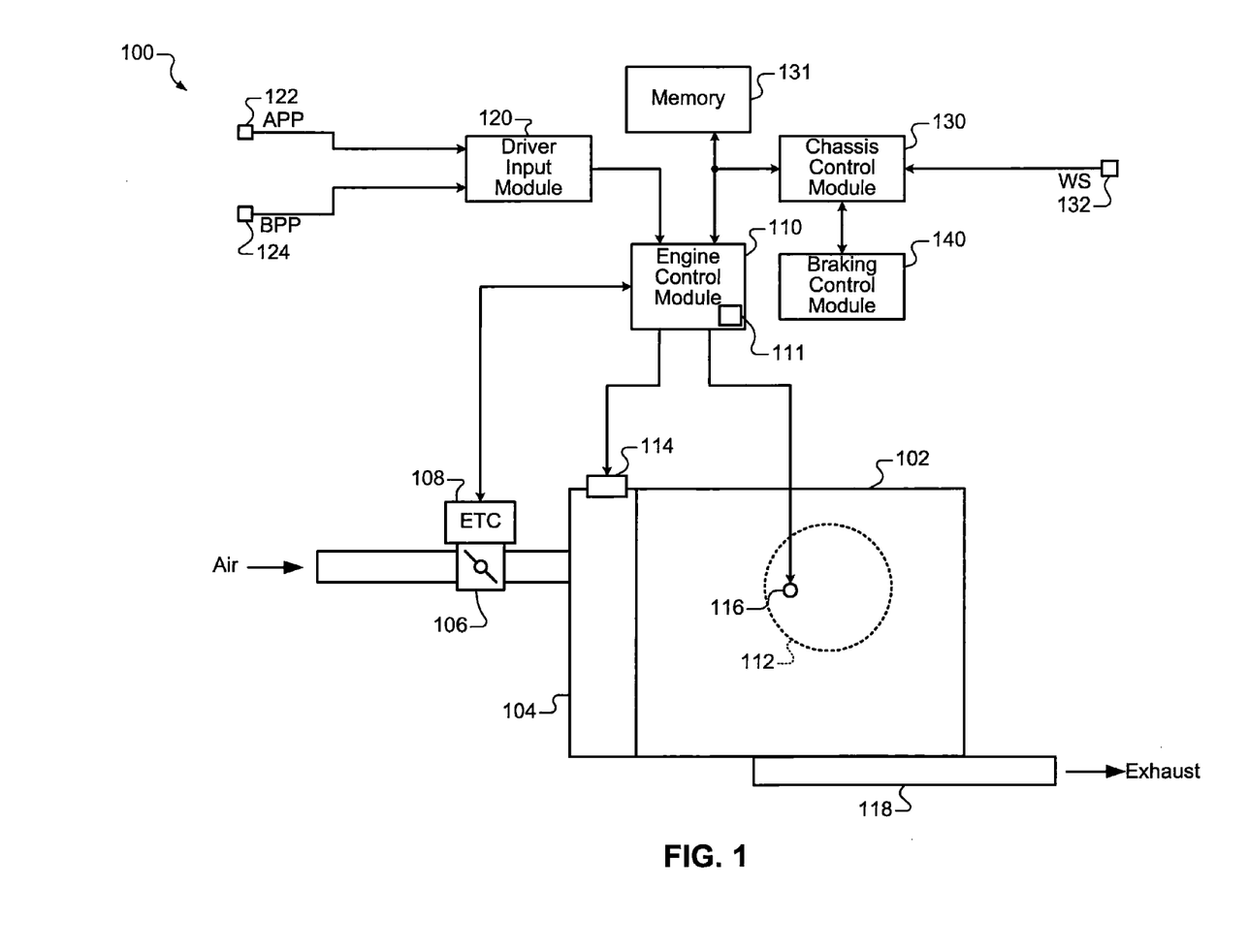
FIG. 1 is a functional block diagram of an exemplary engine system according to the principles of the present disclosure.

Referring now to FIG. 1, a functional block diagram of an exemplary engine system 100 is presented. The engine system 100 may be implemented in any suitable type of vehicle, including a hybrid type vehicle. The engine system 100 includes an engine 102 that combusts an air/fuel mixture to produce drive torque. While a spark ignition, gasoline-type engine is described herein, the present disclosure is applicable to other types of torque producers, not limited to gasoline-type engines, diesel-type engines, fuel cell engines, propane engines, and hybrid-type engines implementing one or more electric motors. Air is drawn into an intake manifold 104 through a throttle valve 106. An electronic throttle controller (ETC) 108 controls the opening of the throttle valve 106.

An engine control module (ECM) 110 regulates opening of the throttle valve 106 via the ETC 108. In this manner, the ECM 110 controls airflow into the intake manifold 104. Air from the intake manifold 104 is drawn into cylinders of the engine 102. While the engine 102 may include multiple cylinders, for illustration purposes only, only representative cylinder 112 is shown. For example only, the engine 102 may include 2, 3, 4, 5, 6, 8, 10, and/or 12 cylinders.

The ECM 110 also controls the amount of fuel injected by fuel injectors, such as fuel injector 114. For example, the ECM 110 may generate a pulse for a predetermined period of time. The fuel injector 114 opens while the pulse is generated. Accordingly, the amount of fuel injected may be adjusted based on the length of the pulse (i.e., the pulse width). The fuel injector 114 may inject fuel into the intake manifold 104 at a central location or at multiple locations, such as near an intake valve that is associated with the cylinder 112. Alternatively, the fuel injector 114 may inject fuel directly into the cylinders. In various implementations, one fuel injector may be provided for each cylinder.

The injected fuel mixes with the air and creates the air/fuel mixture. A piston (not shown) compresses the air/fuel mixture within the cylinder 112. A spark plug 116 is energized based on a signal from the ECM 110, thereby igniting the air/fuel mixture. While the engine 102 is shown as including the spark plug 116, the engine 102 may be any suitable type of engine, such as a compression combustion type engine. In other engine systems, the spark plug 116 may not be necessary to initiate combustion. The byproducts of combustion (i.e., exhaust gas) are expelled from the cylinder 112 to exhaust system 118.

Combustion of the air/fuel mixture causes the piston to rotatably drive a crankshaft (not shown) and produce torque. Torque output by the engine 102 is transferred to a transmission (not shown). The transmission transfers torque to one or more wheels (not shown) of the vehicle. The vehicle may include any suitable number of wheels. For example only, the vehicle may include four wheels.

The ECM 110 controls torque output by the engine 102. For example only, the ECM 110 may include a torque module 111 that controls the torque output by adjusting the airflow into the engine 102, the amount of fuel injected, the spark timing, and/or other suitable engine parameters. The ECM 110 controls the torque output by the engine 102 based on driver inputs. The ECM 110 may also control the torque output based on signals provided by various sensors (not shown), such as a mass airflow (MAF) sensor, a manifold absolute pressure (MAP) sensor, an intake air temperature (IAT) sensor, a coolant temperature sensor, and/or other sensors.

The driver inputs torque and/or speed requests using one or more devices within the vehicle. For example, the driver may actuate an accelerator pedal to request torque and a brake pedal to request (and/or perform) vehicle braking. Actuation of the brake pedal may also be used to request a decrease in torque output by the engine 102. A driver input module 120 receives signals from various sensors that measure the driver inputs.

For example, the driver input module 120 receives signals from one or more accelerator pedal position (APP) sensors (e.g., APP sensor 122) and one or more brake pedal position (BPP) sensors (e.g., BPP sensor 124). The APP sensor 122 measures the position of the accelerator pedal and generates an APP signal based on the position of the accelerator pedal. Similarly, the BPP sensor 124 measures the position of the brake pedal and generates a BPP signal based on the position of the brake pedal. The driver input module 120 transmits the driver inputs to the ECM 110.

The ECM 110 determines a driver torque request based on the driver inputs. The driver torque request corresponds to an amount of torque (e.g., Nm) requested by the driver. The ECM 110 adjusts the torque output of the engine 102 based on the driver torque request. In some circumstances, the ECM 110 may receive torque requests from other vehicle systems, such as a chassis control system. The ECM 110 selectively adjusts the torque output of the engine 102 to meet such torque requests.

A chassis control module 130 generates chassis torque requests for the chassis control system. For example, the chassis control module 130 may generate a chassis torque request to eliminate wheel drag (i.e., when a drag event occurs). A torque request generated based on wheel drag is referred to as a drag torque request. A drag event occurs when a driven wheel decelerates at a different rate than undriven wheels of the vehicle. For example only, a drag event may be caused by operation of the vehicle on a surface having a low coefficient of friction, a gear shift within the transmission, and/or deactivation of one or more cylinders of the engine 102.

The chassis control module 130 receives wheel speed signals from various wheel speed sensors, such as wheel speed sensor 132. While only the wheel speed sensor 132 is shown, the vehicle may include more than one wheel speed sensor and the vehicle may include more than one wheel speed sensor for each wheel of the vehicle.

Each wheel speed sensor, such as the wheel speed sensor 132, measures the rotational speed of one of the wheels of the vehicle. In other words, each wheel speed sensor measures a wheel speed (WS). The wheel speed of a driven wheel is referred to as a driven wheel speed (DWS), while the wheel speed of an undriven wheel is referred to as an undriven wheel speed (UDWS). The chassis control module 130 determines whether a drag event is occurring based on the driven and undriven wheel speeds. The chassis control module 130 generates a drag torque request when a drag event occurs. The drag torque request may be stored in one or more predetermined locations, such as in memory 131.

The drag torque request requests that the ECM 110 increase torque output by the engine 102 (i.e., above the driver torque request) for a predetermined period of time to cure the wheel drag. The increased torque output and the period of time may be calculated to accelerate the speed of the driven wheel to the vehicle speed or to the undriven wheel speed.

The engine system 100 also includes a braking control module 140 that controls vehicle braking. For example, the braking control module 140 may command braking of one of the undriven wheels of the vehicle during the drag torque request. Acceleration of the driven wheel coordinated with braking of an undriven wheel increases vehicle stability and control.

Figure 2A:
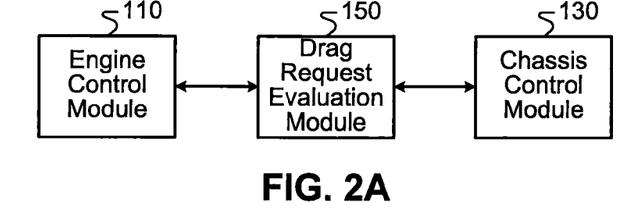
FIGS. 2A-2C are functional block diagrams of exemplary engine control systems including a drag request evaluation module according to the principles of the present disclosure.
Figure 2B:
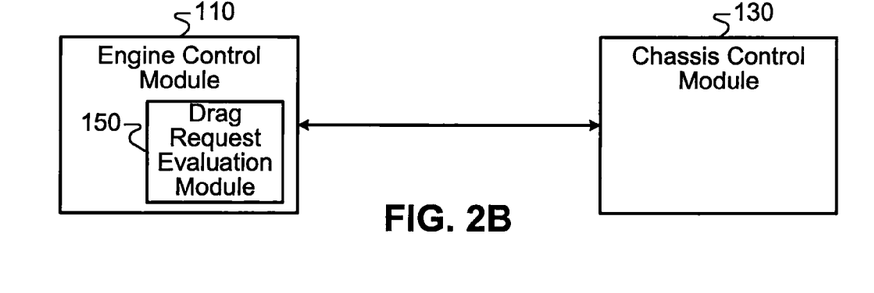
Figure 2C:
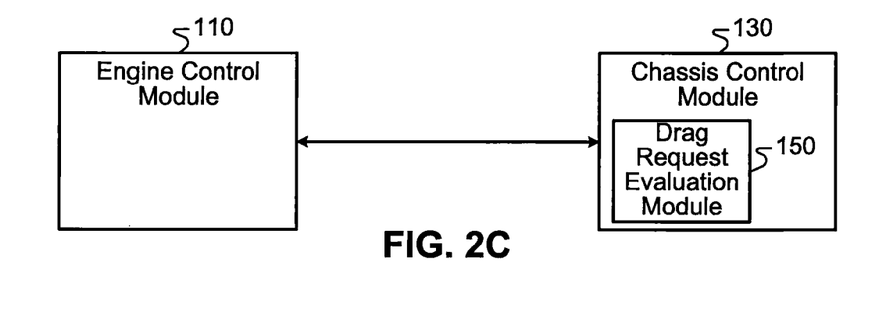

Referring now to FIGS. 2A-2C, functional block diagrams of exemplary control systems are presented. A drag request evaluation module 150 receives the drag torque request, determines whether various enabling conditions are satisfied, and selectively enables or disables execution of the drag torque request based on whether the enabling conditions are satisfied. The ECM 110 increases torque output of the engine 102 based on the drag torque request when the drag torque request is enabled.

If the drag request evaluation module 150 disables execution of the drag torque request, the drag request evaluation module 150 transmits a fault indicator to the chassis control module 130. The drag request evaluation module 150 also reports its reasoning for the disabling. For example, the drag request evaluation module 150 may store data regarding its reasoning in a predetermined location, such as in the memory 131. This data may later be accessed and used for diagnostics and/or calibrations.

After enabling the drag torque request, the drag request evaluation module 150 of the present disclosure selectively disables execution of the drag torque request. In other words, the drag torque evaluation module 150 disables execution of the drag torque request while the torque output of the engine 102 is increased based on the drag torque request. For example, the drag request evaluation module 150 disables execution of the drag torque request when the driven wheel speed exceeds the undriven wheel speed by more than a predetermined speed. As the drag torque request was generated to accelerate the driven wheel speed to the undriven wheel speed, further acceleration of the driven wheel speed is likely unnecessary.

The drag request evaluation module 150 is configured such that it may be located in any suitable location. For example, in one implementation (e.g., FIG. 2A) the drag request evaluation module 150 may be located externally to both the ECM 110 and the chassis control module 130. In other implementations, the drag request evaluation module 150 may be located within the ECM 110 (e.g., see FIG. 2B), within the chassis control module (e.g., see FIG. 2C), or in any other suitable location.

Figure 3:
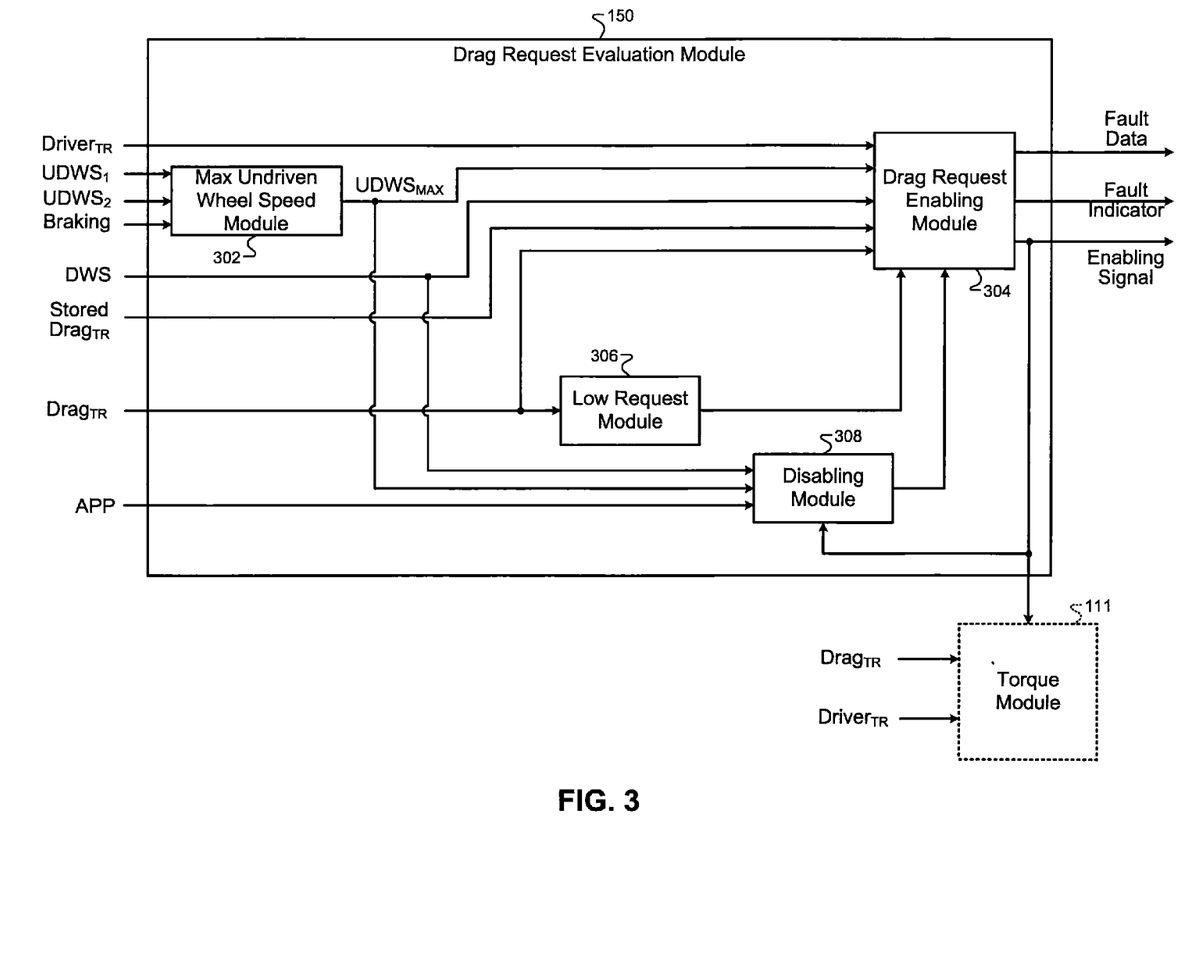
FIG. 3 is a functional block diagram of an exemplary implementation of the drag request evaluation module according to the principles of the present disclosure.

Referring now to FIG. 3, a functional block diagram of an exemplary implementation of the drag request evaluation module 150 is presented. The drag request evaluation module 150 includes a max undriven wheel speed module 302, a drag request enabling module 304, a low request module 306, and a disabling module 308.

The max undriven wheel speed module 302 determines a maximum undriven wheel speed ($UDWS_{MAX}$) based on a comparison of the undriven wheel speeds. For example only, the vehicle may include two undriven wheels: a first undriven wheel and a second undriven wheel. The first and second undriven wheel speeds may be represented as $UDWS_1$ and $UDWS_2$, respectively. The max undriven wheel speed module 302 generally determines the maximum undriven wheel speed based on the greater of the first and second undriven wheel speeds.

When a drag event occurs, the braking control module 140 may command braking of one of the undriven wheels. For example, the braking control module 140 may command braking of an undriven wheel that is located diagonally with respect to the dragging, driven wheel. The maximum undriven wheel speed module 302 sets the maximum undriven wheel speed to the greatest undriven wheel speed during braking when a delta wheel speed (discussed in detail below) is greater than a predetermined speed. The predetermined speed may be calibratable and may be set to, for example only, approximately 5.0 kph.

When the delta wheel speed is not greater than the predetermined speed during braking (e.g., during straight-line braking or driver imposed braking), the maximum undriven wheel speed module 302 rate limits the maximum undriven wheel speed. The rate limit imposed may be calibratable and may be set to, for example, decrement the maximum undriven wheel speed by approximately 2.0 kph/sec. During deceleration when no braking is occurring (e.g., during coasting) and during driver requested acceleration, the maximum undriven wheel speed module 302 sets the maximum undriven wheel speed to the greatest undriven wheel speed.

The drag request enabling module 304 receives the drag torque request ($Drag_{TR}$) and various other inputs and determines whether the enabling conditions are satisfied for execution of the drag torque request. The other inputs may include, for example, the driver torque request ($Driver_{TR}$), the stored drag torque request (Stored $Drag_{TR}$), the maximum undriven wheel speed ($UDWS_{MAX}$), the driven (dragging) wheel speed (DWS), and/or other inputs.

The drag request enabling module 304 enables execution of the drag torque request when various enabling conditions are satisfied. Satisfaction of a first set of enabling conditions may based on, for example, the magnitude of the driver torque request, a comparison of the driver and drag torque requests, a comparison of the drag and stored drag torque requests, and the magnitude of the maximum undriven wheel speed.

Satisfaction of a second set of enabling conditions may be based on the difference between the maximum undriven wheel speed and the driven wheel speed, vehicle deceleration, and/or the magnitude of the drag torque request. The enabling conditions and satisfaction of each of the enabling conditions are discussed below.

The drag request enabling module 304 may determine whether one of the first set of enabling conditions is satisfied based on a comparison of the drag torque request with the driver torque request. For example, this enabling condition may be satisfied when the drag torque request is greater than the driver torque request. When the driver torque request is greater than the drag torque request, execution of the drag torque request may be unnecessary as the engine 102 is already outputting torque in excess of that requested to cure the wheel drag. Accordingly, the drag torque request need not be executed (or enabled) when it is less than the driver torque request.

The drag request enabling module 304 determines whether another one of the first set of enabling conditions is satisfied based on a comparison of the driver torque request with a maximum driver request threshold. For example, this enabling condition may be satisfied when the driver torque request is less than the maximum driver request threshold. The driver torque request threshold may be calibratable and may be set to, for example, 100 Nm. Execution of the drag torque request while the driver torque request is greater than the driver torque request threshold may prevent the driver from controlling the torque output of the engine 102 as desired.

The drag request enabling module 304 also determines whether the drag torque request is equal to the stored drag torque request. If so, this enabling condition of the first set of enabling conditions may be deemed satisfied. As the drag torque request is stored in two locations (e.g., in the memory 131), a difference between the drag torque request and the stored drag torque request may indicate that the drag torque request is invalid or has been corrupted.

The drag request enabling module 304 may also determine whether one of the enabling conditions is satisfied based on a comparison of the drag torque request and a maximum drag request threshold. For example, the drag request enabling module 304 may determine that this enabling condition is satisfied when the drag torque request is less than the maximum drag request threshold. The maximum drag request threshold may be calibratable and may be set based on a maximum possible drag torque request. Drag torque requests that are greater than the maximum drag request threshold are likely invalid. For example only, the maximum drag request threshold may be approximately 250.0 Nm. In various implementations, this enabling condition is included in the first set of enabling conditions.

The drag request enabling module 304 may also determine whether the maximum undriven wheel speed is within a predetermined range of speeds. The predetermined range may be calibratable and may be set based on speeds, outside of which the chassis control module 130 does not generate drag torque requests. For example only, the predetermined range of speeds may include speeds from approximately 4.0 kilometers per hour (kph) to approximately 300.0 kph. The drag request enabling module 304 may deem this enabling condition is satisfied when the maximum undriven wheel speed is within the predetermined range of speeds. In various implementations, this enabling condition is included in the first set of enabling conditions.

The drag request enabling module 304 may also require that at least one of the second set of enabling conditions be satisfied before enabling the drag torque request. The second set of enabling conditions may be based on, for example but not limited to, vehicle deceleration and a difference between the maximum undriven wheel speed and the driven wheel speed.

The drag request enabling module 304 determines a delta wheel speed (ΔWS) based on the difference between the maximum undriven wheel speed and the driven wheel speed. The drag request enabling module 304 may determine that this enabling condition is satisfied when the delta wheel speed is greater than a delta wheel speed threshold. The delta wheel speed threshold may be calibratable and may be set to, for example, approximately 2.5 kph.

Whether the enabling condition regarding vehicle deceleration is satisfied may be determined based on a comparison of the vehicle deceleration with a deceleration threshold. For example, the drag request enabling module 304 may deem this enabling condition satisfied when the vehicle deceleration is less than the deceleration threshold. The deceleration threshold may be calibratable and may be set based on a maximum deceleration that may be experienced when the driver removes pressure from the accelerator pedal while traversing a hill. For example only, the deceleration threshold may be set to a deceleration of approximately 1.0 kph/sec.

The vehicle deceleration may be determined based on any suitable measure of vehicle speed. For example, the vehicle deceleration may be determined based on the driven wheel speed or the transmission output speed. A filter may also be applied to the used measure of vehicle speed. The drag request enabling module 304 may determine whether to apply a filter based on a ratio of signal to noise for the used measure of vehicle speed. For example only, a weighted moving average filter may be applied. The filter coefficient of the filter applied may be calibratable and may be set to, for example, approximately 0.8.

Based on the above mentioned enabling conditions, the drag request enabling module 304 may enable execution of the drag torque request using the following relationship (relationship 1). Enable execution of the drag torque request if:
  the drag torque request is greater than the driver torque request;
  the driver torque request is less than the maximum driver request threshold;
  the drag torque request is less than the maximum drag request threshold;
  the maximum undriven wheel speed is within the predetermined range of speeds; and
  the delta wheel speed is greater than the delta wheel speed threshold; or
  the vehicle deceleration is less than the deceleration threshold.

The drag request enabling module 304 may not require satisfaction of one or more of the enabling conditions when the drag torque request is a low drag request (e.g., less than a low drag request threshold). The low request module 306 transmits a low request indicator to the drag request enabling module 304 when the drag torque request is a low drag request. The low drag request threshold may be calibratable and may be set to, for example, approximately 50.0 Nm.

When the drag torque request is a low drag request, the drag request enabling module 304 may refrain from evaluating one or more of the enabling conditions. In other words, the drag request enabling module 304 might not require satisfaction of one or more of the enabling conditions when the drag torque request is a low drag request. For example only, the drag request enabling module 304 may refrain from evaluating the delta wheel speed and the vehicle deceleration conditions when the drag torque request is a low drag request. The drag request enabling module 304 may also refrain from evaluating one or more of the first set of enabling conditions when the drag torque request is a low drag request.

The drag request enabling module 304 enables execution of the drag torque request when the enabling conditions are satisfied. For example, the drag request enabling module 304 may generate an enabling signal or set an enabling flag to enable execution of the drag torque request. The ECM 110 increases the torque output of the engine 102 based on the drag torque request after the drag torque request is enabled. As shown in FIG. 3, the torque module 111 may increase the torque output when the drag torque request is enabled. The increased torque output of the engine 102 is maintained based on the drag torque request for the period of time that the increase in torque output is requested (i.e., while the drag torque request is active).

The disabling module 308 is enabled when execution of the drag torque request is enabled. The disabling module 308 selectively disables execution of the drag torque request based on the maximum undriven wheel speed and the driven wheel speed. For example, the disabling module 308 disables execution of the drag torque request when the driven wheel speed exceeds the maximum undriven wheel speed by more than a predetermined speed. Accordingly, the disabling module 308 may disable execution of the drag torque request using the relationship:

$$\text{Disable if DWS} > \text{UDWS}_{MAX} + \text{predetermined speed,}$$

where $\text{UDWS}_{MAX}$ is the maximum undriven wheel speed and DWS is the driven wheel speed. The predetermined speed may be calibratable and may be set, for example, based on a maximum possible difference between the $\text{UDSW}_{MAX}$ and the DWS that may be experienced while the vehicle is turning.

The disabling module 308 may also selectively disable execution of the drag torque request based on actuation of the accelerator pedal. However, the driver often experiences inertial effects of driving, which may cause the driver to unintentionally actuate the accelerator pedal. The disabling module 308 may refrain from disabling execution of the drag torque request during such actuation of the accelerator pedal.

However, the disabling module 308 disables execution of the drag torque request when the driver actuates the accelerator pedal for at least a predetermined period of time. The predetermined period may be calibratable and may be set based on, for example, a minimum period of time necessary for the driver to actuate the accelerator pedal from a zero input position to a maximum position and back to the zero input position. For example only, the predetermined period may be set to approximately 100.0 ms.

The ECM 110 ceases controlling the torque output of the engine 102 based on the drag torque request when the disabling module 308 disables the drag torque request. For example, the ECM 110 may decrease the torque output of the engine 102 back to the driver requested torque when execution of the drag torque request is disabled. Discussion of control of the torque output of the engine 102 for the drag torque request can be found in commonly assigned U.S. patent application Ser. No. 12/357,740, filed Jan. 22, 2009 and U.S. patent application Ser. No. 12/364,027, filed Feb. 2, 2009, the disclosures of which are expressly incorporated herein by reference in their entirety.

The drag request enabling module 304 transmits a fault indicator to the chassis control module 130 if one or more of the enabling conditions are not satisfied or when execution of the drag torque request is disabled. Such an indication that the drag torque request will not be executed or has been disabled may prevent the chassis control module 130 from "winding up" or incrementally increasing the drag torque request over time. The chassis control module 130 may also take remedial measures when the fault indicator is received, such as initiating internal diagnostics.

The drag request enabling module 304 also reports fault data when one or more of the enabling conditions are not satisfied or when execution of the drag torque request is disabled. The fault data may be stored in a predetermined location, such as in the memory 131. For example only, the fault data may include data regarding which of the enabling conditions was not satisfied and data regarding whether the condition was intermittent or continuous.

Figure 4:
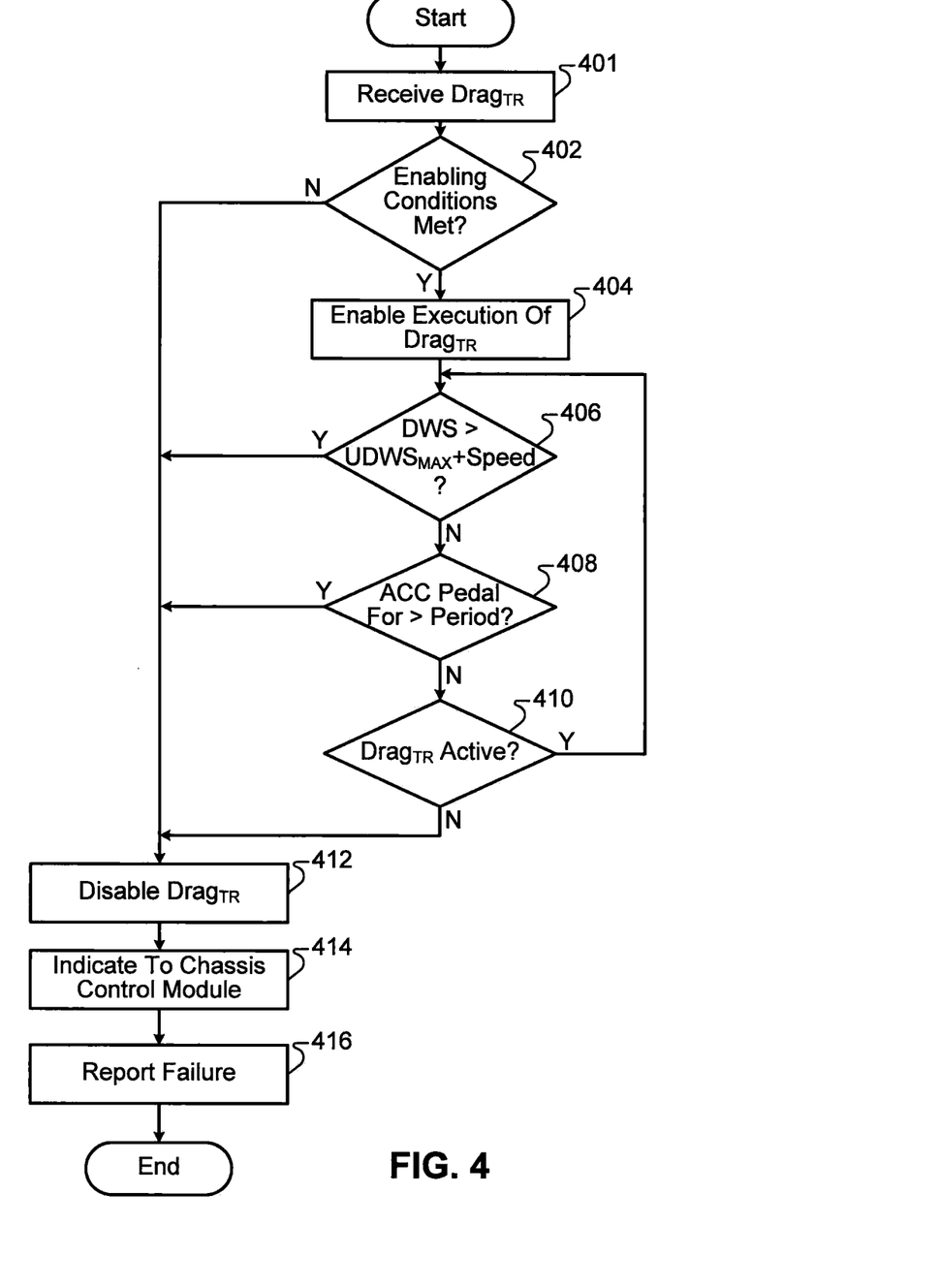
FIG. 4 is a flowchart depicting exemplary steps performed by the drag request evaluation module according to the principles of the present disclosure.

Referring now to FIG. 4, a flowchart depicting exemplary steps performed by the drag request evaluation module 150 is presented. Control begins in step 401 where control receives the drag torque request. Control may also receive other inputs, as discussed above. Control continues in step 402 where control determines whether the enabling conditions for the drag torque request have been satisfied. If true, control continues to step 404; otherwise, control transfers to step 412. For example only, control may determine whether the enabling conditions are satisfied using relationship 1, as described above.

In step 412, control disables execution of the drag torque request. The ECM 110 adjusts the torque output of the engine 102 based on the driver torque request when the drag torque request is disabled. Control proceeds to step 414 where control transmits the fault indicator to the chassis control module 130. In step 416, control reports fault data, such as the source of the fault and whether the fault was continuous or intermittent. Control then ends.

Referring back to step 404 (i.e., when the enabling conditions are satisfied), control enables the drag torque request. The ECM 110 increases the torque output of the engine 102 based on the drag torque request when the drag torque request is enabled. In this manner, control increases torque output of the engine 102 in excess of the driver torque requests to eliminate the wheel drag.

Control proceeds to step 406, where control determines whether the driven wheel speed (DWS) is greater than the maximum undriven speed ($UDSW_{MAX}$) by more than the predetermined speed. If true, control transfers to step 412; otherwise, control continues to step 408. In other words, control disables the drag torque request when the driven wheel speed exceeds the maximum undriven wheel speed by more than the predetermined speed. The predetermined speed may be calibratable and may be set, for example, based on a maximum speed by which the driven wheel speed may exceed the maximum undriven wheel speed while the vehicle is turning.

Control determines whether the driver has actuated the accelerator pedal for at least a predetermined period of time in step 408. If true, control transfers to step 412; otherwise, control continues to step 410. In other words, control disables execution of the drag torque request when the driver actuates the accelerator pedal for at least the predetermined period. For example only, the predetermined period of time may be set to approximately 100.0 ms. The predetermined period may be calibratable and may be set, for example, based on the minimum amount of time necessary for the driver to actuate the accelerator pedal from a zero input position to a maximum position and back to the zero input position.

In step 410, control determines whether the drag torque request is still active. If true, control returns to step 406; otherwise, control continues to step 412. In other words, control disables the drag torque request when the drag torque request becomes inactive (i.e., when the chassis control module 130 stops requesting the drag torque request). Otherwise, control keeps monitoring the conditions of steps 406 and 408 to determine whether the drag torque request should be disabled at an earlier time.

Figure 5A:
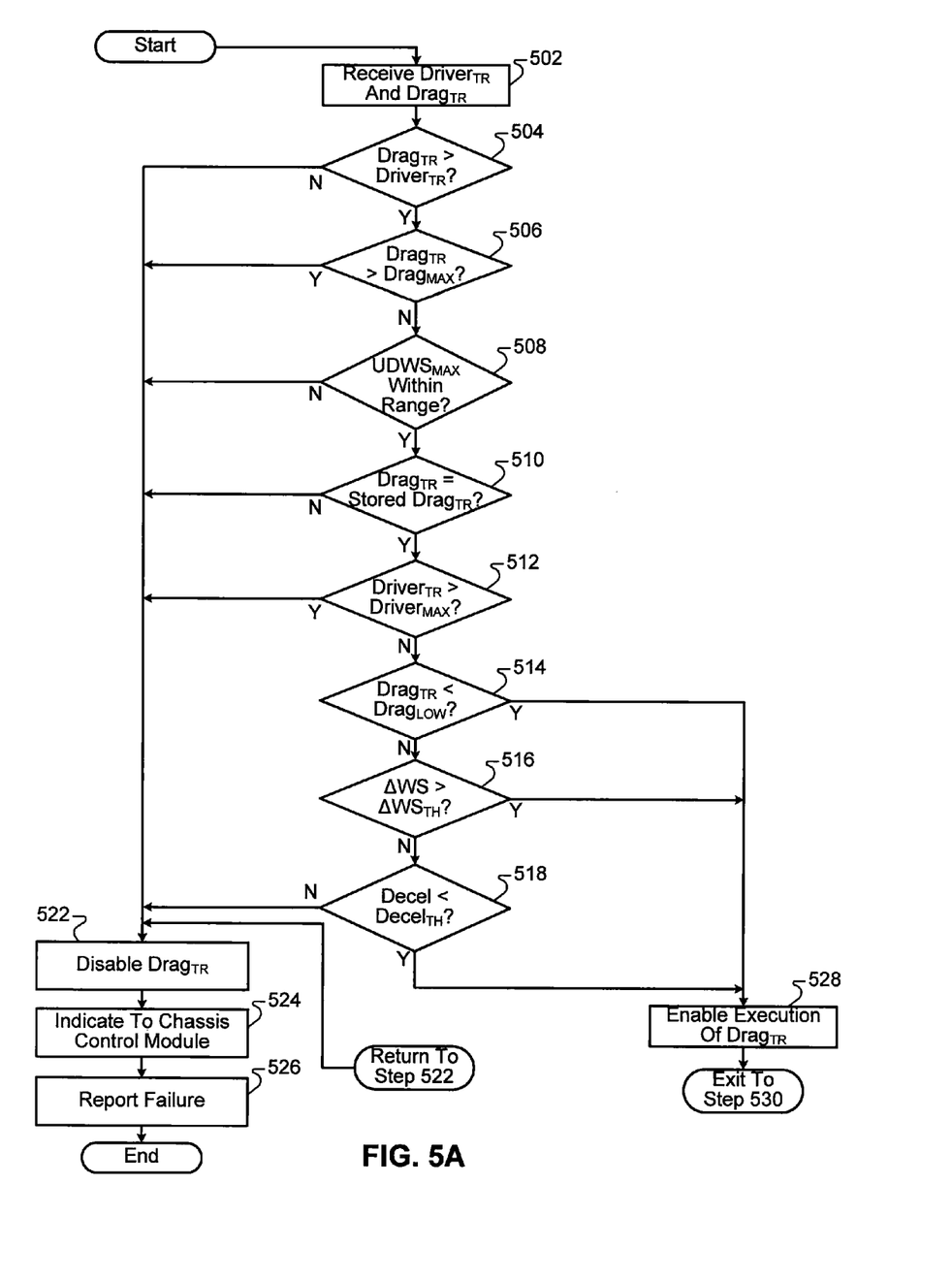
FIGS. 5A-5B is another flowchart depicting exemplary steps performed by the drag request evaluation module according to the principles of the present disclosure.

Referring now to FIG. 5A, another flowchart depicting exemplary steps performed by the drag request evaluation module 150 is presented. Control begins in step 502 where control receives the drag torque request ($Drag_{TR}$) and the driver torque request ($Driver_{TR}$). Control may also receive other inputs, as discussed above. Control continues in step 504 where control determines whether the drag torque request is greater than the driver torque request. If true, control continues to step 506; otherwise, control transfers to step 522.

In step 522, control disables the drag torque request. Control transmits the fault indicator to the chassis control module 130 in step 524, and control reports the fault in step 526. Control may perform steps 522, 524, and 526 similarly or identically to steps 412, 414, and 416 of FIG. 4, respectively. Control then ends.

Referring back to step 506 (i.e., when the drag torque request is greater than the driver torque request), control determines whether the drag torque request is greater than the maximum drag request threshold. If true, control transfers to step 522; otherwise, control continues to step 508. In other words, control disables the drag torque request and prevents the drag torque request from being executed when the drag torque request is greater than the maximum drag request threshold. The maximum drag request threshold may be calibratable and may be set to, for example, approximately 250.0 Nm.

In step 508, control determines whether the maximum undriven wheel speed ($UDWS_{MAX}$) is within a predetermined range of speeds. If true, control proceeds to step 510; otherwise, control transfers to step 522. In other words, control disables the drag torque request and prevents execution of the drag torque request when the maximum undriven wheel speed is outside the predetermined range of speeds. The predetermined range of speeds may be calibratable and may be set to speeds between, for example, approximately 4.0 kph and approximately 300.0 kph.

In step 510, control determines whether the drag torque request is equal to the stored drag torque request (Stored $Drag_{TR}$). If true, control proceeds to step 512; otherwise, control transfers to step 522. In other words, control disables the drag torque request and prevents execution of the drag torque request when the drag torque request differs from the stored drag torque request.

Control determines whether the driver torque request is greater than the maximum driver request threshold in step 512. If true, control transfers to step 522; otherwise, control continues to step 514. In other words, control disables the drag torque request and prevents execution of the drag torque request when the driver torque request is greater than the maximum driver request threshold. In step 514, control determines whether the drag torque request is less than the low drag request threshold ($Drag_{LOW}$). If true, control transfers to step 528; otherwise, control continues to step 516. For example only, the low drag request threshold may be set to approximately 50.0 Nm.

Figure 5B:
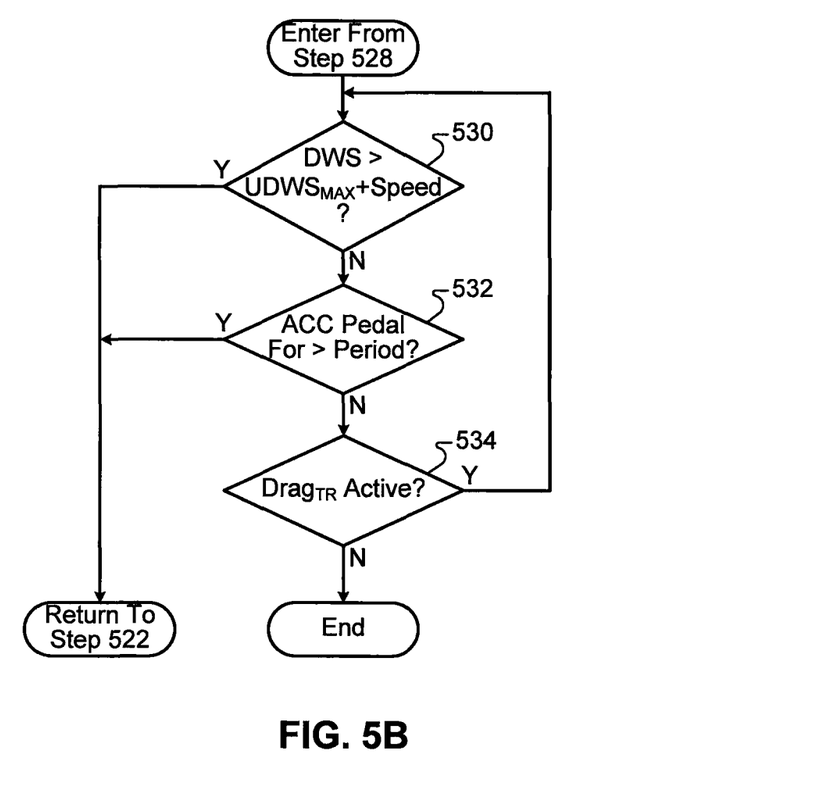

In step 528, control enables execution of the drag torque request and control continues to step 530 (i.e., exits FIG. 5A and continues to step 530 of FIG. 5B). In steps 530, 532, and 534, control proceeds similarly to steps 406, 408, and 410 of FIG. 4, respectively. In this manner, control refrains from determining whether the delta wheel speed or vehicle deceleration meet specified conditions before enabling the drag torque request.

Referring back to step 516 (i.e., when the drag torque request is greater than the low drag request threshold), control determines whether the delta wheel speed is greater than the delta wheel speed threshold ($\Delta WS_{TH}$). If true, control transfers to step 528 and enables execution of the drag torque request; otherwise, control continues to step 518. For example only, the delta wheel speed threshold may be set to approximately 2.5 kph. Control determines the delta wheel speed based on the difference between the maximum undriven wheel speed and the driven wheel speed.

In step 518, control determines whether the vehicle deceleration ($Decel_V$) is less than the deceleration threshold ($Decel_{TH}$). If true, control transfers to step 528 and enables execution of the drag torque request; otherwise, control transfers to step 522. Control may determine the vehicle deceleration based on any suitable measure of vehicle speed, such as the driven wheel speed or the transmission output speed. Control may also apply a filter to the measure of vehicle speed used to calculate the vehicle deceleration. For example only, control may apply a weighted moving average filter and the deceleration threshold may be set to approximately 1.0 kph/sec.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a vehicle, comprising:
   a torque module that controls torque output of an engine based on a driver torque request and that increases said torque output based on a wheel drag torque request generated based on a driven wheel speed; and
   a drag request evaluation module that disables said increase of said torque output when said driven wheel speed is greater than an undriven wheel speed by more than a predetermined speed,
   wherein said predetermined speed is determined based on a maximum difference between said driven wheel speed and said undriven wheel speed during vehicle turning.

2. The engine control system of claim 1 wherein said drag request evaluation module disables said increase when an accelerator pedal is actuated longer than a predetermined period during said increase.

3. The engine control system of claim 1 wherein said undriven wheel speed corresponds to a greatest speed of one of a plurality of undriven wheels of said vehicle.

4. A vehicle system comprising:
   a chassis control module that includes the drag request evaluation module of claim 1 and that generates said wheel drag torque request; and
   an engine control module that controls said torque output of said engine.

5. A vehicle system comprising:
   an engine control module including the engine control system of claim 1; and
   a chassis control module that generates said wheel drag torque request.

6. The engine control system of claim 1 wherein said drag request evaluation module prevents said increase when at least one of:
   said wheel drag torque request is less than said driver torque request;
   said driver torque request is greater than a predetermined maximum driver torque request;
   said wheel drag torque request is one of greater than and less than a stored wheel drag torque request;
   said wheel drag torque request is greater than a predetermined maximum wheel drag torque request; and
   said undriven wheel speed is one of greater than and less than a predetermined range of speeds.

7. The engine control system of claim 1 wherein said drag request evaluation module selectively prevents said increase when at least one of:
   a difference between said driven wheel speed and said undriven wheel speed is less than a predetermined speed difference; and
   a vehicle deceleration is greater than a predetermined deceleration when said wheel drag torque request is generated.

8. The engine control system of claim 7 wherein said drag request evaluation module prevents said increase while said wheel drag torque request is greater than a predetermined minimum wheel drag torque request.

9. The engine control system of claim 1 further comprising a chassis control module that generates said wheel drag torque request,
   wherein said drag request evaluation module at least one of selectively prevents and disables said increase, and
   wherein said drag request evaluation module provides fault data to said chassis control module when said increase is at least one of prevented and disabled.

10. An engine control method for a vehicle, comprising:
   controlling torque output of an engine based on a driver torque request;
   increasing said torque output based on a wheel drag torque request generated based on a driven wheel speed; and disabling said increase of said torque output when said driven wheel speed is greater than an undriven wheel speed by more than a predetermined speed, wherein said predetermined speed is determined based on a maximum difference between said driven wheel speed and said undriven wheel speed during vehicle turning.

11. The engine control method of claim 10 further comprising disabling said increasing when an accelerator pedal is actuated longer than a predetermined period during said increase.

12. The engine control method of claim 10 wherein said undriven wheel speed corresponds to a greatest speed of one of a plurality of undriven wheels of said vehicle.

13. The engine control method of claim 10 further comprising:
generating said wheel drag torque request using a chassis control module; and
controlling said torque output of said engine using an engine control module.

14. The engine control method of claim 10 further comprising preventing said increasing when at least one of:
said wheel drag torque request is less than said driver torque request;
said driver torque request is greater than a predetermined maximum driver torque request;
said wheel drag torque request is one of greater than and less than a stored wheel drag torque request;
said wheel drag torque request is greater than a predetermined maximum wheel drag torque request; and
said undriven wheel speed is one of greater than and less than a predetermined range of speeds.

15. The engine control method of claim 10 further comprising preventing said increasing when at least one of:
a difference between said driven wheel speed and said undriven wheel speed is less than a predetermined speed difference; and
a vehicle deceleration is greater than a predetermined deceleration when said wheel drag torque request is generated.

16. The engine control method of claim 15 further comprising preventing said increasing while said wheel drag torque request is greater than a predetermined minimum wheel drag torque request.

17. The engine control method of claim 10 further comprising:
generating said wheel drag torque request using a chassis control module;
at least one of selectively preventing and disabling said increasing using a second module; and
providing fault data to said chassis control module when said increase is at least one of prevented and disabled.

18. An engine control system for a vehicle, comprising:
a torque module that controls torque output of an engine based on a driver torque request and that increases said torque output based on a wheel drag torque request generated based on a driven wheel speed; and
a drag request evaluation module that disables said increase of said torque output when said driven wheel speed is greater than an undriven wheel speed by more than a predetermined speed and when an accelerator pedal is actuated longer than a predetermined period during said increase.

19. An engine control method for a vehicle, comprising:
controlling torque output of an engine based on a driver torque request;
increasing said torque output based on a wheel drag torque request generated based on a driven wheel speed;
disabling said increase of said torque output when said driven wheel speed is greater than an undriven wheel speed by more than a predetermined speed; and
disabling said increase when an accelerator pedal is actuated longer than a predetermined period during said increase.

* * * * *